Figure 1:
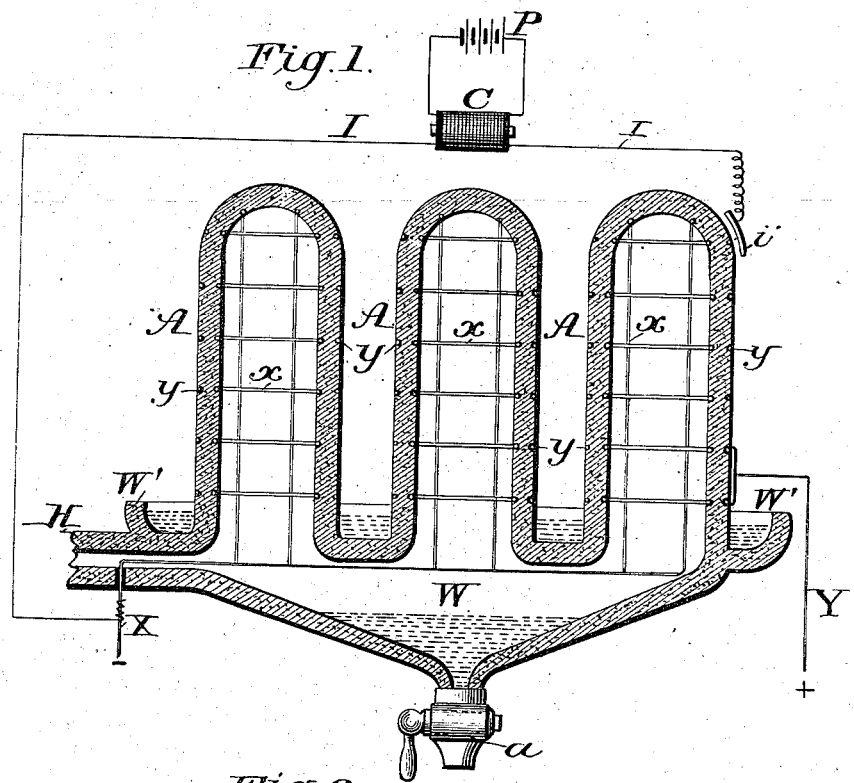

No. 655,110. Patented July 31, 1900.
A. PLECHER.
GAS BATTERY.
(Application filed Nov. 23, 1899.)

(No Model.)

WITNESSES:
Jos. A. Ryan
Edw. W. Byrn.

INVENTOR
Andrew Plecher
BY Munn & Co.
ATTORNEYS

UNITED STATES PATENT OFFICE.

ANDREW PLECHER, OF SAVANNAH, GEORGIA.

GAS-BATTERY.

SPECIFICATION forming part of Letters Patent No. 655,110, dated July 31, 1900.

Application filed November 23, 1899. Serial No. 738,026. (No model.)

*To all whom it may concern:*

Be it known that I, ANDREW PLECHER, of Savannah, in the county of Chatham and State of Georgia, have invented a new and useful Improvement in Gas-Batteries, of which the following is a specification.

The object of my invention is to provide an electric battery in which the generation of current is effected by the direct chemical union of two gases—oxygen and hydrogen, for instance. It is well known that certain substances—such as platinum or palladium or other metals of this group—have the peculiar effect of causing the union of two such gases when brought together on its surface. In the "Doebereiner" lamp, for instance, when a mixture of oxygen and hydrogen impinges upon the platinum in a finely-divided condition—such as sponge-platinum or platinum-black—the surface action of the platinum causes the two gases to unite and to heat the platinum red hot, which in turn automatically ignites the gases. The chemical union of the two gases in such case is attended by the correlated phenomenon of heat, for the reason that the interatomic action produces a series of short-circuited couples whose resistance gives heat instead of electric current. My invention is designed to prevent this production of heat and to get its correlative equivalent in electric current by separating the positive side of the atoms from the negative side and by thus segregating the positive from the negative forces to carry them off in an extraneous circuit which permits it to be used in a controllable electric circuit. Gas-batteries operating on this general principle have heretofore been invented and I do not claim to be the first to have observed this principle nor to provide means for carrying it out.

My invention consists, however, in a novel construction and arrangement of the elements of such a battery designed for greater efficiency and simplicity, and to that end it consists, first, in a cell whose body structure is of some porous material which is homogeneously filled throughout its entire structure with platinum or its equivalent in a finely-divided condition, which cell-body has brought to its surface on one side one of the gases—hydrogen, for instance—and on the other side the other gas—oxygen, for instance—and providing said cell with two gathering-electrodes of great superficial extent, one of them bathed in the hydrogen-saturated surface of the cell, and the other in the oxygen-saturated surface of the cell, whereby when the hydrogen and oxygen unite through the action of the finely-divided platinum in the homogeneously-filled cell the two electrodes will gather the liberated forces of opposite polarity as union takes place between the atoms and carry them off through the conducting-wires of an extraneous circuit.

My invention also consists in so constructing the cell or cells as to receive and hold the water or other resultant product from the union of the two gases, and also further in promoting the union of the two gases by the stimulating effect of a static discharge from an induction-coil, which at the same time depolarizes the battery and dissipates the water formed, all as hereinafter more fully described.

Figure 2:
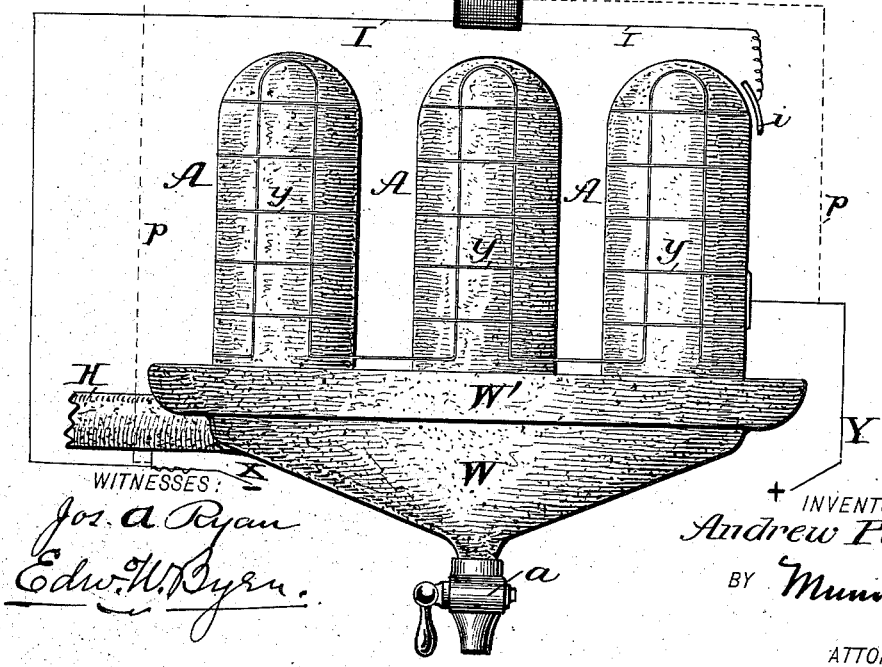

Figure 1 is a vertical section through a gas-battery constructed in accordance with my invention, and Fig. 2 is an external side view of the same.

In the drawings, A A A represent three cells, which may be of any shape, but for convenience are shown as inverted cups. Each cell is a counterpart of the others, and there may be any number connected in series, as shown, or in multiple, according to well-known principles.

The cell-body A is composed of some porous material which is capable of withstanding a considerable degree of heat and is not disintegrated by the action of the chemical products formed. I prefer to use clay or plaster-of-paris as a body-vehicle, which is mixed with a solution of chlorid of platinum or of palladium or other metals of the platinum group. The cell is then molded to shape and after being dried is subjected to heat to harden and drive off by destructive distillation the chlorin gas, thereby leaving in the porous cell-body the metal platinum or its equivalent in a very finely-divided condition distributed homogeneously through the body substance of the cell, but with the metallic particles detached or with their continuity of contact broken up by the clay or plaster-of-paris forming the body of the cell. Instead of depositing platinum or palladium in this manner any analogous material which by surface action will unite the gases may be incorporated throughout the body of the cell in a similar way. Before the hardening of this cell its inner wall is inlaid with a gathering-electrode of platinum wire $x$, extended in the shape of a grill or coils over the entire inner walls of the cell and connected to an external circuit-wire X. On the outside of the cell a similar gathering-electrode $y$ is placed, preferably embedded or inlaid in the plastic substance of the cell and extended in the shape of a coil or cage, so as to cover the entire external surface of the cell and connected to an external circuit-wire Y. The open lower ends of the cell-cups are all in open communication with a subjacent trap-chamber W, having an outlet-cock $a$ and a gas-inlet H, through which latter hydrogen or other gas is admitted, so as to fill the interior of all the cells and bathe the inner electrode $x$ in an atmosphere of hydrogen, while the outer electrode $y$ is bathed in the oxygen of the atmosphere. Oxygen and hydrogen are thus brought into juxtaposed layers, being separated only by the pervious cell-body A, filled with finely-divided platinum, and having one electrode bathed in an oxygen stratum and the other in the hydrogen. These two gases will then through the stimulating effect of the finely-divided platinum unite, forming water which trickles down into the subjacent trap-chamber W or accumulates in the external trough W'. A cock $a$ in the bottom of the trap-chamber allows the water to be drawn off from time to time.

When the chemical union of the gases takes place to form water, the correlated equivalent in electrical energy will be liberated and, gathering in one polarity on the oxygen-bathed electrode $y$ and in another polarity on the hydrogen-bathed electrode $x$, will establish itself in a flow through the external circuit-wires X and Y, that may be utilized for any purpose.

To promote the more active union of the two gases, an induction-coil C has its secondary wire I connected to the cells A, as shown. To avoid short-circuiting the cells, one terminal $i$ of the secondary wire may be out of contact with the external electrode $y$, as shown. This induction-coil may be operated either by a separate battery-cell P or by wires $p\,p'$, connected to the main circuit-wires X Y of the gas-battery, so as to be self-energizing. The induced electric current not only promotes the union of the gases, but drives the water from the pores and prevents polarization.

In carrying out my invention I do not confine myself to the particular form of cell shown and described, as this may be varied in many ways without departing from my invention.

I am aware that a gas-battery cell has been formed in which a plate of porous material like earthenware or plaster-of-paris has been filled with sulfuric acid as an electrolyte and has its external surface coated with perforated platinum or gold-foil, the two gases being introduced on opposite sides. My invention is distinctive, first, in constructing the cells without any special electrolyte, but is homogeneously filled with the finely-divided platinum or its equivalent, and, secondly, in the stimulating and depolarizing effect of the induction-coil, which by its discharges drives the water from the pores and allows the gases to come in contact and unite.

In my invention no electrolyte is necessary, and it is not only unnecessary but objectionable, since in giving conductivity it would submerge and diminish the active surface of the finely-divided metal. The form and arrangement of my battery-cells are also of great simplicity and efficiency, as the oxygen is taken from the air and the hydrogen is housed within the cell. By the method of preparing the cell the greatest possible active surface is obtained in the simplest and cheapest way. The medium employed also at the same time gives shape to the battery-cell and no other substance except the wires and electrodes is required.

In making use of my invention I do not confine it to the action of hydrogen and oxygen alone, but may employ it in connection with any two gases which have a chemical affinity for each other.

If desired, dry air or gas may be passed around the cells to evaporate the water formed.

In defining the scope of my invention I would state that in the designation of the metals by the term "of the platinum group" I do not wish to be considered as being limited to a strict interpretation of this phrase, as it is intended to cover gold as well, which is not always so classified. I prefer to use, however, and will generally employ platinum for this purpose.

Having thus described my invention, what I claim as new, and desire to secure by Letters Patent, is—

1. A gas-battery comprising a cell formed of a porous solid non-conducting body, homogeneously filled with a chemically-deposited metal of the platinum group, and having on one side a superficial electrode adapted to be covered by one gas, and on the other side a superficial electrode adapted to be covered by the other gas substantially as and for the purpose described.

2. A gas-battery having a cell constructed of non-conducting material homogeneously filled with a chemically-deposited metal of the platinum group and having electrodes on its opposite sides combined with an induction-coil having its secondary wires connected to electrodes on the opposite sides of the walls of said cell to send a discharge through its walls for stimulating the action and securing depolarization as described.

3. A gas-battery having a cell constructed of non-conducting material homogeneously filled with a chemically-deposited metal of the platinum group and having electrodes on its opposite sides combined with an induction-coil having its secondary wire connected to said electrodes to act through the cell-body, and its primary wire connected to the circuit-wires of the gas-battery substantially as described.

4. A gas-battery having a cell constructed as a retaining-cup for the hydrogen or combustible gas, said cup being made of porous non-conducting material having homogeneously distributed through its body, a chemically-deposited metal of the platinum group and electrodes on its opposite faces as set forth.

5. A gas-battery having a cell constructed as an inverted gas-retaining cup composed of porous refractory non-conducting material filled with a chemically-deposited metal of the platinum group homogeneously distributed through it, and electrodes on its opposite faces, and a subjacent receptacle for receiving the water formed by the chemical union of the gases as described.

6. The gas-battery consisting of inverted cup-shaped cells A of porous refractory non-conducting material having internal and external electrodes and a common subjacent water-receptacle as shown and described.

In testimony whereof I have signed my name to this specification in the presence of two subscribing witnesses.

ANDREW PLECHER.

Witnesses:
JOHN F. McQUADE,
WILLIAM MAYER.